United States Patent [19]

Tetrick

[11] Patent Number: 5,737,615
[45] Date of Patent: Apr. 7, 1998

[54] MICROPROCESSOR POWER CONTROL IN A MULTIPROCESSOR COMPUTER SYSTEM

[75] Inventor: R. Scott Tetrick, Portland, Oreg.

[73] Assignee: Intel Corporation, Santa Clara, Calif.

[21] Appl. No.: 421,389

[22] Filed: Apr. 12, 1995

[51] Int. Cl.$^6$ ............................................. G06F 1/32
[52] U.S. Cl. ...................... 395/750.06; 364/273.1; 364/DIG. 1
[58] Field of Search ................................. 395/750, 868, 395/750.01, 750.06; 364/273.1, DIG. 1

[56] References Cited

U.S. PATENT DOCUMENTS

| | | | |
|---|---|---|---|
| 4,679,191 | 7/1987 | Nelson et al. | 370/84 |
| 4,980,836 | 12/1990 | Carter et al. | 364/483 |
| 5,511,205 | 4/1996 | Kannan et al. | 395/750 |
| 5,521,854 | 5/1996 | Kadowaki et al. | 364/707 |
| 5,568,649 | 10/1996 | MacDonald et al. | 395/868 |
| 5,613,126 | 3/1997 | Schmidt | 395/733 |
| 5,638,542 | 6/1997 | Nikjou | 395/750 |
| 5,675,772 | 10/1997 | Liu et al. | 395/500 |

*Primary Examiner*—John E. Harrity
*Attorney, Agent, or Firm*—Blakely, Sokoloff, Taylor & Zafman

[57] ABSTRACT

A power down control mechanism for multiprocessor computer systems. A power down register is maintained for providing a power down control signal to the multiple processing units in the multiprocessing system. Individual processing units can be selectively onlined or offlined as needed. In addition, during system initialization, the power down mechanism of the present invention can be used for onlining additional processors and also used for preventing faulty processors from attempting to become the system's boot system processor.

11 Claims, 3 Drawing Sheets

MICROPROCESSOR POWER CONTROL IN A MULTIPROCESSOR COMPUTER SYSTEM

BACKGROUND OF THE INVENTION

1. Field of the Invention

The present invention relates to the field of computer architecture. More particularly, the present invention relates to power savings techniques in multiprocessor computer systems.

2. Art Background

Power consumption in computer systems, particularly portable computers, is a growing concern to computer system architects. This is particularly true with respect to battery powered portable computing units and especially true for battery powered units with multiple microprocessors. Modern microprocessors, with millions of transistors, can quickly drain batteries operating at the limits of today's battery technology.

In an effort to reduce the power consumption of computer systems, one of the greatest power-using portions of the computer system has been focused on. Reduced power microprocessors are now being designed for use in power sensitive implementations and are designed to run on lower operating voltages and thus consume less power. In addition, mechanisms have been designed for reducing the amount of power consumed by a microprocessor when the microprocessor is not busy. It is common now for portable computer systems to include a mechanism for shutting down a microprocessor after a certain amount of time of inactivity. One such mechanism is described in the Intel Pentium Databook for a low power rendition of the Intel Pentium™ Microprocessor. This low power microprocessor, referred to as the P54C or P54C/M includes a stop clock pin STPCLK#. This pin is used to stop the internal clock for the P54C microprocessor which shuts down some of its functional units so that it will consume less power.

The provision of the STPCLK# input pin on the P54C/M microprocessor, and similar pins implemented on other processing units, allows the system hardware to control the power consumption of the CPU by stopping the internal clock to the CPU core in a controlled manner. This low power state, as it is referred to with respect to the P54C/M, is not a complete power off state for the processor, but rather is a low power state which allows certain processing unit operations to continue such as the maintenance of cache coherency.

In prior computer systems which incorporate microprocessors having a STPCLK# control or one similar to it, the invocation of the feature has been the result of total inactivity by the computer system. Computer systems having multiple microprocessors, multiprocessing computer systems, have additional power consumption concerns. Operation of a multiprocessing computer system with all processing units active can deplete battery resources in an inefficient manner. However, it is not necessarily the case that the computer system is inactive for situations to arise where only some of the processing units might be desirably powered down to a low power state. It is therefore an object of the present invention to provide a mechanism for multiprocessing computer systems which allows various combinations of processing units to be powered down to a low power state while others remain active.

SUMMARY OF THE INVENTION

From the foregoing it can be appreciated that power consumption concerns in multiprocessing computer systems are of paramount importance. Accordingly, it is an object of the present invention to provide a method and apparatus for controlling power consumption in multiprocessing computer systems through a method and apparatus for selectively onlining and offlining of individual processing units within the multiprocessing computer systems to reduce overall power consumption. Another object of the present invention is to provide a selective onlining mechanism during system boot-up to prevent faulty microprocessors from being selected as the multiprocessing computer system's boot system processor.

These and other objects of the present invention are provided in a computer system architecture which includes onlining and offlining mechanism including a control register with bits corresponding to each of the microprocessors in multiprocessing system. Each of the microprocessors is equipped with a power down input pin which controls the operating state of the microprocessor. The signal asserted on the power down input pin is determined in accordance with the values of a corresponding bit set in the power down control register. Control logic within the computer system allows for the offlining and onlining of processors in the multiprocessing system by the toggling of a corresponding bit within the power down control register. Thus, it is possible to operate the multiprocessing computer system with some but not all of the processors being shut down to reduce the overall power consumption of the multiprocessing computer system.

The present invention also provides a mechanism which aids in the initialization process for multiprocessing computer systems. The power down mechanism of the present invention may be used to prevent faulty processing units from attempting to achieve the status of the boot system processor (BSP) when the computer system is initialized or reset. Ordinarily, in a multiprocessing system, each processor will assume it is the BSP until one of the processors is established as the BSP. The establishment of one processor as the BSP is essentially a race to set a flag bit in a register or memory location at a predetermined memory address. The processor which first reads and then toggles the BSP bit in the register becomes the BSP. The remaining processors then determine that they are not intended to be the BSP and shut down until the BSP has booted the system and brings them online. Note that other mechanisms may be implemented for determining the BSP.

The power down mechanism of the present invention can be used for the purposes of offlining and onlining the non-BSP processors in the multiprocessing computer system. Further, if a particular processor is determined to be faulty, then the power down mechanism of the present invention can be used to prevent faulty processors from attempting to become the BSP.

In one particular embodiment of the present invention, a variation of the power down mechanism is implemented for preventing a faulty processor from becoming the BSP. In this embodiment, it is not sufficient to assert the power down input signal to the processor to prevent it from racing to get the BSP flag. In this one embodiment, an additional pin is utilized for providing a signal to the microprocessor's microcode which in turn activates the necessary mechanism for preventing the processor from attempting to become the BSP.

BRIEF DESCRIPTION OF THE DRAWINGS

The objects, features and advantages of the present invention will become apparent to one of ordinary skill in the art in light of the following detailed description in which.

DETAILED DESCRIPTION OF THE INVENTION

A method and apparatus are described for selectively onlining and offlining microprocessors in a multiprocessing computer system. Throughout this detailed description, numerous references are made to specific details such as particular pin names and interrupt protocols. However, it will be understood by one of ordinary skill in the art that the present invention may be practiced without such specific details and may in fact be applied to numerous multiprocessing computer system applications where power consumption and processing unit onlining and offlining are concerns. In addition, many well-known elements, devices, process steps and the like are not set forth in order to avoid obscuring the present invention.

Figure 1:
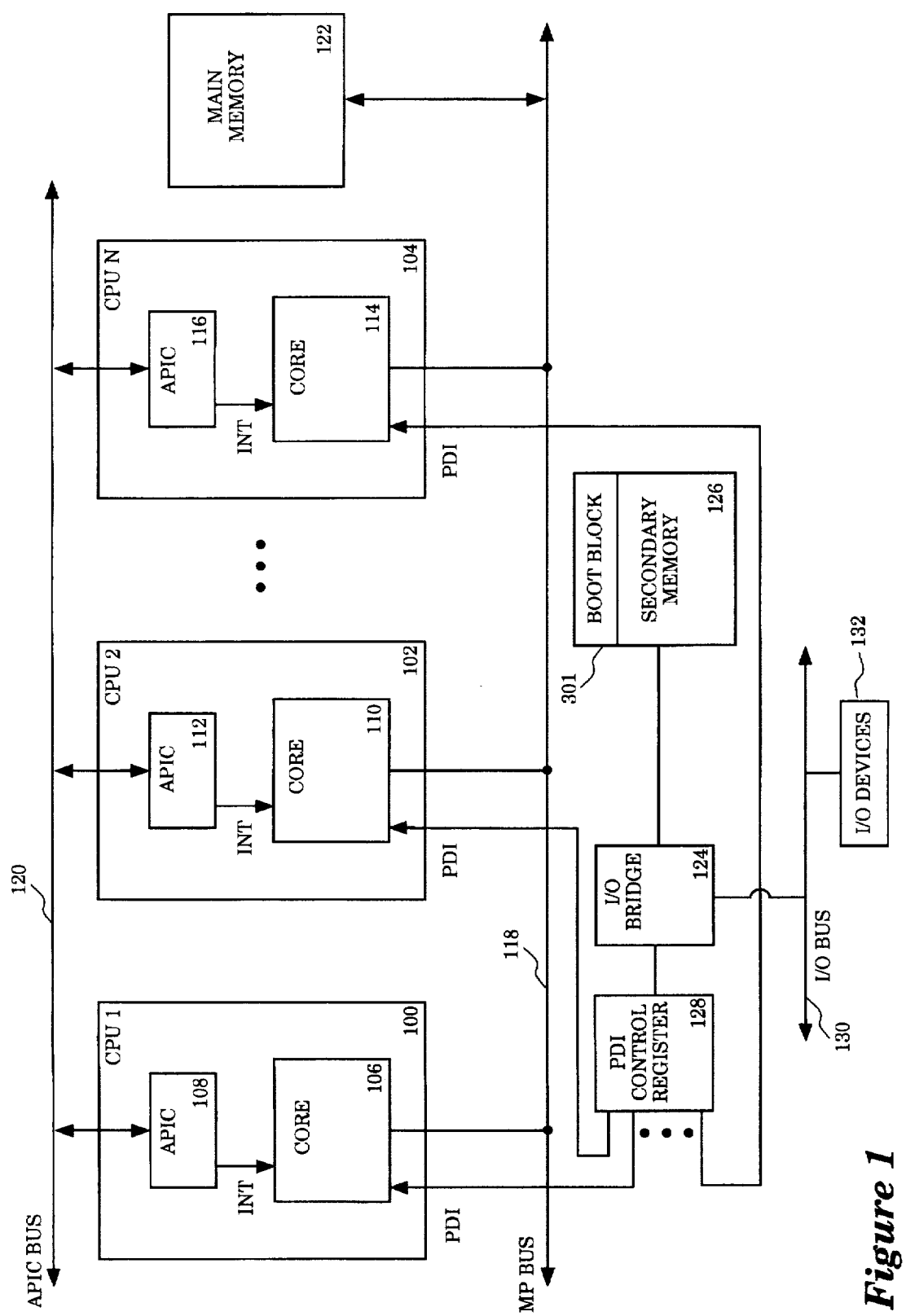
FIG. 1 illustrates a multiprocessor computer system architecture incorporating the present invention.

Referring now to FIG. 1, a multiprocessing computer system incorporating the present invention is illustrated. The multiprocessing computer system includes a first central processing unit (CPU) 100, a second CPU 102, and an arbitrary number of additional CPUs up to CPU N 104. The CPUs 100, 102 and 104 each include a CPU core, 106, 110 and 114, respectively. Each of the CPUs 100, 102 and 104 in the illustrated embodiment also includes an advanced programable interrupt controller (APIC) (i.e., 108, 112 and 116, respectively). The multiple CPUs of the multiprocessing computer system are coupled over a multiprocessing bus 118. Further, the illustrated system includes an APIC bus 120 to which are coupled the APICs of each of the processors. The purpose and function of APICs is generally well known. They process interrupts received by the processor and then provide an interrupt signal to the processor core for handling interrupts appropriately. With respect to the present invention, the APICs will come into play in a manner discussed further herein below with respect to the initialization operation of the multiprocessing computer system. In accordance with one embodiment of the present invention, each of the central processing units is compatible with the Intel Microprocessor Architecture.

The computer system architecture of the present invention illustrates that through the multiprocessor bus 118, the processing units are coupled to a main memory device 122 which is typically in the form of dynamic RAM (DRAM). Also coupled to the multiprocessor bus 118 is an I/O bridge 124 which serves as an interface in the illustrated embodiment to a secondary memory device 126. The I/O bridge 124 also couples the processing units of the multiprocessing system to an I/O bus 130 for connection to I/O devices 132. The secondary memory device 126 may take the form of system ROM or other storage device.

An important aspect of the illustrated processing units that is exploited by the present invention is the power down input (PDI) of each processor. Microprocessors designed in accordance with the Intel Microprocessor Architecture include a STPCLK (stop clock) pin which provides the power down input function for the microprocessor. Other microprocessors may include an input which performs a similar power down input function. The power down input is used to power down or put to sleep a processor by stopping the clock circuitry within the microprocessor. This feature is specially important in laptop and other battery-operated computer as described above in a preceding section.

The power down feature, when activated, stops the processor clock, which in turn prevents instructions from being fetched from external memory by the processor core. This feature is used to reduce power consumption and thereby reduce battery drain. One common example of the power down feature being applied occurs when a computer is left on for a predetermined period of time without activity and the processor is instructed to go to sleep. Frequently, this action is accompanied by a dimming of the display monitor.

Also illustrated in FIG. 1 in accordance with the present invention is a power down input (PDI) control register 128, shown coupled to the I/O bridge 124. The PDI control register 128 is shown in more detail in FIG. 2. Those skilled in the art will recognize that the PDI control register 128 need not be a register but may be any other kind of memory element, and further it may be incorporated within the I/O bridge 124 or other memory location.

Figure 2:
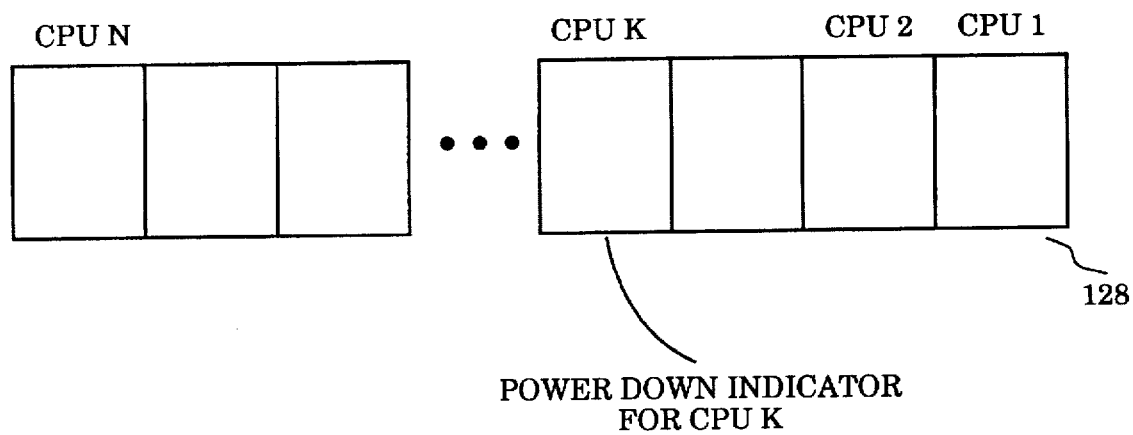
FIG. 2 illustrates a graphical representation of the power down register for use in accordance with the power consumption techniques of the present invention.

The PDI control register 128 comprises a number of bits, each preferably corresponding to one of the processors in the multiprocessing computer system as illustrated by FIG. 2. Each bit defines the active or inactive state of the PDI (STPCLK) input of the corresponding processing unit. For example, when a particular bit K of the PDI control register 128 is set, the corresponding processing unit, CPU K, detects an active signal asserted on its PDI input and is thereby taken offline. Conversely, when a PDI control register bit is reset, the corresponding processor is brought online. Preferably, the PDI control register 128 is a memory map register driven by software through the I/O bridge 124.

In accordance with the intel Microprocessor Architecture, assertion of the PDI input (STPCLK) causes the P54C/M (described above) to stop its internal clock and consume less power while still responding to interprocessor interrupts and external snoop requests. This low power state is called the Stop Grant state. When the CPU recognizes a STPCLK interrupt, the CPU will do the following: first, the processor will wait for all instructions being executed to complete. Next, the processor will flush the instruction pipeline of any instructions waiting to be executed. Third, a special bus cycle is driven to indicate that the clock is being stopped. Then, the processor will wait for all pending bus cycles to complete and finally the processor disables the clock to most of its internal units.

For microprocessors designed in accordance with the intel Microprocessor Architecture, to exit Stop Grant state the STPCLK signal must be driven (not floated). The falling edge of STPCLK will tell the CPU that it can return to program execution at the instruction following the interrupted instruction. Other microprocessor architectures may operate differently for power consumption purposes in response to an active signal on the respective processor's PDI input.

In accordance with the present invention, the online or offline state of each processor may be separately controlled by setting the appropriate bit in the PDI control register 28. Applications may take advantage of this feature for power savings purposes and control the setting of bits within the PDI control register 28 to reduce the number of processors that are active at any time. For example, an application may designate different processors for different tasks with each processor being taken offline as its task is completed. Another example of use of the present invention might be provided by system hardware which would detect a low power state of the battery and make an election to disable several of the processors to reduce consumption without eliminating all processing power. Another example is that processors may watch for the faults of other processors. For example, a first CPU may be faulty and signal a faulty processor interrupt to which a second CPU may respond by setting an appropriate bit in the PDI register 128 to take the faulty processor offline. When a processor takes a certain kind of fault, it will propagate an interrupt over the system's APIC which will be recognized by the other processor on the multiprocessor bus. This allows a responding processor to set the corresponding bit in the PDI register for the faulty processor to take the processor offline. The APICs, in accordance with this embodiment, are capable of determining from the information available over the APIC bus which processor is the faulty processor. The sender of the faulty processor interrupt will include the ID of the APIC in accordance with the operation under the Intel Microprocessor Architecture. From this, the identity of the faulty CPU can be determined which in turn allows the appropriate PDI register bit to be set. Those of ordinary skill in the art will conceive of many uses for the power down control provided by the present invention.

It should be understood that the present invention is suitable for inclusion in a computer system architecture which is upgradable to be a multiprocessing computer system. In this situation, a computer system motherboard may provide sockets or receptacle spaces for receiving multiple processing units with connection points for each of the power down inputs described above. Accordingly, the present invention defines a communication path from the power down control register 128 to the connection points provided for receiving the power down inputs of any microprocessing units applied to the computer system.

There is an additional embodiment of the present invention which may be implemented in accordance with one embodiment of a microprocessor to handle a situation that arises during system initialization, also referred to as system boot-up. In general, in a multiprocessing computer system, one of the CPUs will be designated the boot system processor (BSP) which retrieves the boot block of main memory (FIG. 1, #301) for initializing the computer system. In one multiprocessing computer system architecture, the designation of the BSP may not be defined a priori. In this situation, each of the microprocessors, upon power up, will assume they are the BSP and the processors will race to read a flag that may be maintained on the microprocessor bus or in an I/O bridge. The first processor to read the flag will toggle it, and assume the role of BSP. All subsequent processors reading the flag will see that it has already been set and not become the BSP.

Figure 3:
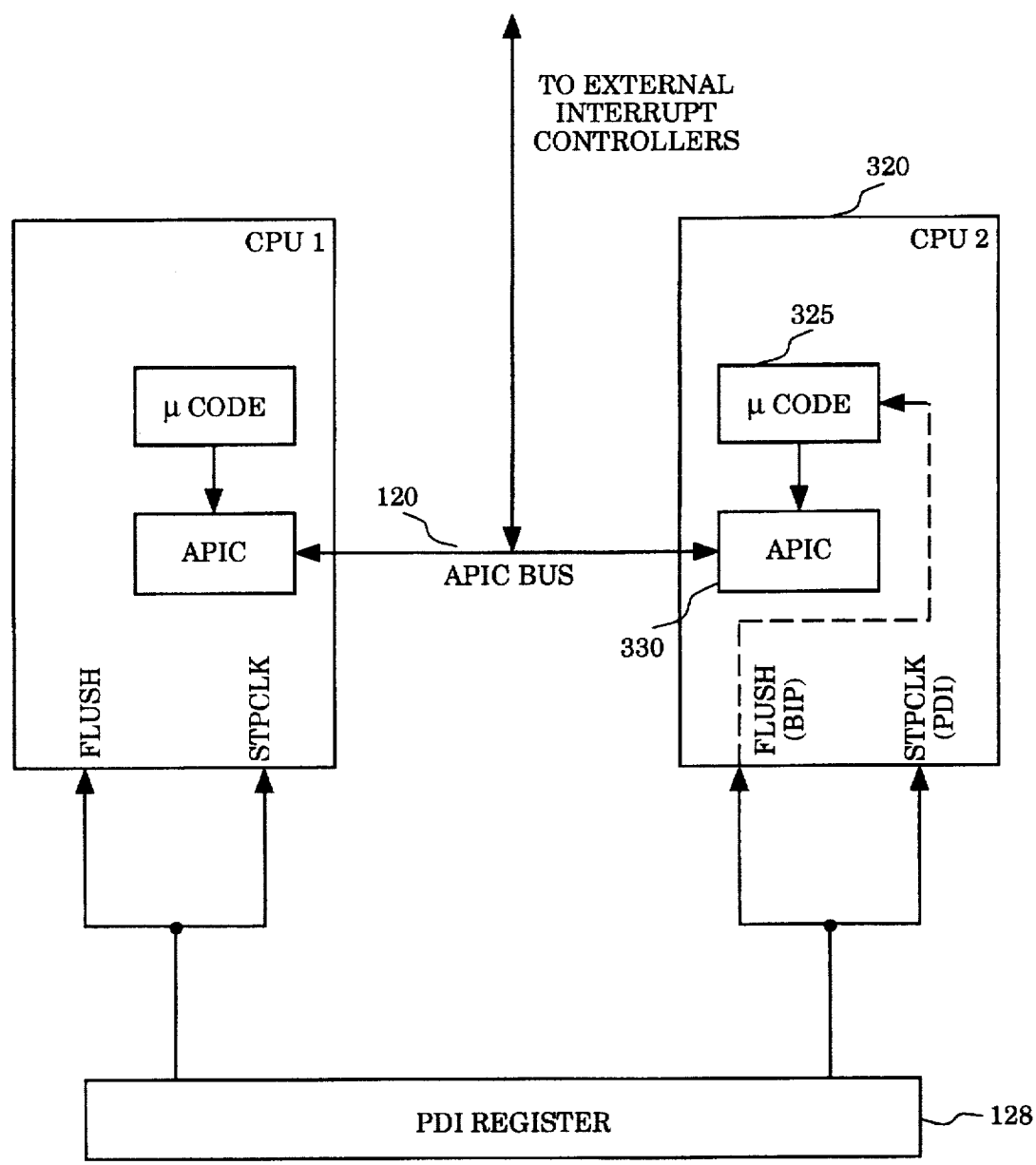
FIG. 3 illustrates one embodiment of the present invention which is implemented to affect multiprocessor system initialization control.

In accordance with the above computer system multiprocessing approach, a special situation arises with respect to faulty processing units during system initialization. It is desirable to prevent a faulty processor from attempting to become the multiprocessing system's BSP. However, in this embodiment, illustrated in FIG. 3, a microprocessor will not respond to an asserted STPCLK signal during initialization. In accordance with this embodiment, another mechanism is required for having a processing unit respond to an active bit set in the PDI register 128. In this embodiment, it is recognized that the microprocessor 320 will include microcode 325 that controls microprocessor operation during system initialization. The microprocessor 320, in accordance with this one embodiment, will instruct the processor's APIC 330 to inhibit the processor from racing to become the BSP. Thus, the PDI register 128, in accordance with this embodiment, in addition to being coupled to the STPCLK pin of the processor (the PDI pin in this embodiment), is also tied to a boot inhibit pin (designated the flush pin in accordance with the illustrated embodiment) for providing the active signal from the PDI register to the CPU microcode upon power up.

There has thus been described a method and apparatus for selectively onlining and offlining processing units within a multiprocessing computer system. Although the present invention has been described in terms of illustrated and preferred embodiments, it should be understood that this is by way of explanation and not limitation. Accordingly, the scope of the present invention should be measured in accordance with the claims which follow.

What is claimed is:

1. A multiprocessing computer system comprising:

a plurality of processing units, wherein each processing unit has a corresponding power down input, wherein an active signal on one of said power down inputs causes a corresponding processing unit to enter a reduced power usage state other than off, wherein at least one of the processing units includes a boot inhibit input to selectively prevent the at least one processing unit from becoming a boot system processor during system initialization; and a power down memory element having a plurality of memory locations, each memory location coupled to a corresponding power down input, wherein a power consumption of a selected processing unit varies in accordance with a value stored in a corresponding memory location.

2. The multiprocessing computer system of claim 1 wherein said power down memory element comprises a power down control register having a plurality of bits, wherein each of said bits corresponds to a desired signal state to be applied to the power down input of a corresponding one of said processing units.

3. The multiprocessing computer system of claim 2 further comprising:

a multiprocessing bus coupled to each of said plurality of processing units; and an I/O bridge coupled to said multiprocessing bus, said i/O bridge incorporating said power down control register.

4. The multiprocessing computer system of claim 1 wherein said boot inhibit input is tied to said processing unit's power down input during system initialization.

5. A computer system comprising:

a first central processing unit having a first power down input;

a second central processing unit having a second power down input and a boot inhibit input, wherein the boot inhibit input selectively prevents the second central processing unit from becoming a boot system processor during system initialization; and a power down control register having a first bit coupled to communicate with the power down input of said first central processing unit and a second bit coupled to communicate with the power down input of the second central processing unit, wherein a reduced power usage state of the first and second central processing units is controlled by a value stored in the power down control register.

6. The computer system of claim 5 further comprising:

an additional plurality of central processing units, each having a power down input; said power down control register having an additional plurality of bits, each respectively coupled to a corresponding one of the power down inputs of said additional plurality of central processing units.

7. The computer system of claim 5 further comprising an I/O bridge device coupled to communicate with said first and second central processing units, said I/O bridge incorporating said power down register.

8. A computer system motherboard comprising:

a first receptacle for receiving a first central processing unit said first receptacle including a first connection point for a first power down input of said first central processing unit;

a second receptacle for receiving a second central processing unit, said second receptacle including a second connection point for a second power down input of said second central processing unit and a third connection point for receiving a boot inhibit signal;

a power down control memory element for storing first and second processing unit power usage control bits;

a first connection path coupled to provide a signal to said first connection point determined by said first power usage control bit; and a second connection path coupled to provide a signal to said second connection point determined by said second power usage control bit.

9. The computer system motherboard of claim 8 wherein said second and third connection points are coupled to receive a common signal during system initialization.

10. A method of controlling power consumption in a computer system having a plurality of processing units comprising the steps of:

storing data in a power down memory element which corresponds to the power usage state desired for each of said plurality of processing units;

propagating said data to power down inputs of said plurality of processing units to effect said desired power usage state for each of said plurality of processing units; and propagating said data to boot system processor inhibit inputs of said plurality of processing units during system initialization to selectively prevent processing units from becoming a boot system processor.

11. The method of claim 10 wherein said storing data step comprises the step of setting bits in a power down control register wherein each bit corresponds to the input signal to be provided to the power down input of a corresponding one of said plurality of processing units.

* * * * *

UNITED STATES PATENT AND TRADEMARK OFFICE
CERTIFICATE OF CORRECTION

PATENT NO. : 5,737,615
DATED : April 7, 1998
INVENTOR(S) : R. Scott Tetrick

It is certified that error appears in the above-identified patent and that said Letters Patent is hereby corrected as shown below:

In column 4 at line 35 delete "intel" and insert "Intel"

In column 4 at line 49 delete "intel" and insert "Intel"

In column 4 at line 50 insert --the-- following "exit" and prior to "Stop"

In column 6 at line 44 delete "i/O" and insert --I/O--

Signed and Sealed this

First Day of September, 1998

Attest:

Attesting Officer

BRUCE LEHMAN

Commissioner of Patents and Trademarks